(12) United States Patent
Kondapalli et al.

(10) Patent No.: US 11,068,138 B2
(45) Date of Patent: *Jul. 20, 2021

(54) REPORT MANAGEMENT SYSTEM

(71) Applicant: ADP, LLC, Roseland, NJ (US)

(72) Inventors: Satish Veera Venkata Kondapalli, Hyderabad (IN); Pradeep Vasu, Hyderabad (IN); Roberto Rodrigues Dias, Porto Alegre (BR); Venkata Vijaya Kumar Canakala, Roseland, NJ (US); Nageswararao Katakam, Hyderabad (IN); Parthasarathi Datta, Hyderabad (IN); Sumit Gupta, Hyderabad (IN); Amitkumar Patel, Roseland, NJ (US); Ketan Chauhan, New York, NY (US); Donald E. Studley, III, Maplewood, NJ (US); Cory Schamble, New York, NY (US)

(73) Assignee: ADP, LLC, Roseland, NJ (US)

( * ) Notice: Subject to any disclaimer, the term of this patent is extended or adjusted under 35 U.S.C. 154(b) by 211 days.

This patent is subject to a terminal disclaimer.

(21) Appl. No.: 16/132,234

(22) Filed: Sep. 14, 2018

(65) Prior Publication Data

US 2020/0089394 A1    Mar. 19, 2020

(51) Int. Cl.
| | | |
|---|---|---|
| *G06F 3/0481* | (2013.01) | |
| *G06F 3/0346* | (2013.01) | |
| *G06F 3/0338* | (2013.01) | |
| *G06F 3/01* | (2006.01) | |
| *G06T 7/50* | (2017.01) | |
| *G06F 3/0484* | (2013.01) | |
| *G06F 3/0482* | (2013.01) | |

(Continued)

(52) U.S. Cl.
CPC ........ *G06F 3/04842* (2013.01); *G06F 3/0482* (2013.01); *G06F 3/04817* (2013.01); *G06F 40/186* (2020.01); *G06Q 10/10* (2013.01)

(58) Field of Classification Search
CPC .............. G06F 3/04842; G06F 40/186; G06F 3/04817; G06F 3/0482; G06F 40/103; G06Q 10/10
See application file for complete search history.

(56) References Cited

U.S. PATENT DOCUMENTS

| | | |
|---|---|---|
| 5,832,504 A | 11/1998 | Tripathi et al. |
| 6,925,468 B1 | 8/2005 | Bobbitt et al. |

(Continued)

*Primary Examiner* — Jennifer N To
*Assistant Examiner* — K C Chen
(74) *Attorney, Agent, or Firm* — Yee & Associates, P.C.

(57) ABSTRACT

A method and apparatus for generating reports. A computer system displays an application with fields in a graphical user interface on a display system. The application is used to perform transactions for an organization. The computer system identifies a group of the fields displayed in the graphical user interface that is selectable for use in a group of the reports. The computer system displays a group of graphical indicators in association with the group of the fields in the graphical user interface. The computer system receives a selection of a portion of the group of the fields displayed in the graphical user interface in user input. The computer system creates the group of the reports using the portion of the group of the fields. The computer system sends the group of the reports to an output device, enabling performing an operation for the organization using the group of the reports.

21 Claims, 9 Drawing Sheets

(51) Int. Cl.
    *G06Q 10/10*     (2012.01)
    *G06F 40/186*     (2020.01)

(56) References Cited

U.S. PATENT DOCUMENTS

| | | |
|---|---|---|
| 7,188,100 B2 | 3/2007 | De Bellis et al. |
| 7,516,175 B1 * | 4/2009 | Greene .................. G06Q 40/00 709/201 |
| 7,640,496 B1 | 12/2009 | Chaulk et al. |
| 2002/0013786 A1 | 1/2002 | Machalek |
| 2004/0117731 A1 | 6/2004 | Blyashov |
| 2004/0252134 A1 | 12/2004 | Bhatt et al. |
| 2004/0255239 A1 * | 12/2004 | Bhatt .................... G06F 16/904 715/225 |
| 2005/0039033 A1 | 2/2005 | Meyers et al. |
| 2005/0240615 A1 * | 10/2005 | Barsness ............... G06F 16/221 |
| 2007/0208698 A1 * | 9/2007 | Brindley ........... G06F 16/24549 |
| 2012/0173570 A1 * | 7/2012 | Golden .............. G06Q 10/0631 707/769 |
| 2014/0244627 A1 * | 8/2014 | Bhatia .................. G06F 16/972 707/722 |
| 2016/0179930 A1 * | 6/2016 | Radivojevic .......... G06F 3/0482 707/792 |
| 2017/0178135 A1 * | 6/2017 | Bull ..................... G06Q 20/407 |

\* cited by examiner

REPORT MANAGEMENT SYSTEM

BACKGROUND INFORMATION

1. Field

The present disclosure relates generally to an improved computer system and, in particular, to a method and apparatus for managing reports. Still more particularly, the present disclosure relates to a method and apparatus for creating new reports for applications.

2. Background

Information systems are used for many different purposes. The different operations performed using the information system may be referred to as transactions. For example, an information system may be used to process payroll to generate paychecks for employees in an organization. The different operations performed to generate paychecks for a pay period using the information system may be referred to as a transaction.

Additionally, an information system also may be used by a human resources department to maintain benefits and other records about employees. For example, a human resources department may manage health insurance, wellness plans, and other programs in an organization using an employee information system. As yet another example, an information system may be used to determine when to hire new employees, assign employees to projects, perform reviews for employees, and other suitable operations for the organization.

Other uses of information systems include purchasing equipment and supplies for an organization. In yet another example, information systems may be used to plan and rollout a promotion of a product for an organization.

Often times, an operator may desire to generate a report for a particular type of transaction. Currently, the operator may use report generator software to generate reports that are human readable from different sources such as databases in the information systems. Currently available report generator software are often more difficult to use than desired.

This type of software requires the operator to have knowledge about how information is stored to select what information to use in a report. For example, the operator may need to know what fields, tables, or columns in the database should be selected for including desired information in the report.

As a result, an operator may need to have experience or training with respect to report generator software and databases in addition to the experience and training to perform the transaction for which the report is being generated. This additional skill may limit the number of operators who are able to generate reports. Additionally, operators who do not generate reports very often may find that report generating may take more time and may be more difficult than desired.

Therefore, it would be desirable to have a method and apparatus that take into account at least some of the issues discussed above, as well as other possible issues. For example, it would be desirable to have a method and apparatus that overcome the technical problem with operators performing transactions being unable to generate reports as efficiently as desired without knowledge about how the information is stored.

SUMMARY

An embodiment of the present disclosure provides a method for generating reports. A computer system displays an application with fields in a graphical user interface on a display system. The application is used to perform transactions for an organization. The computer system identifies a group of the fields displayed in the graphical user interface that is selectable for use in a group of the reports. Further, the computer system displays a group of graphical indicators in association with the group of the fields in the graphical user interface. Still further, the computer system receives a selection of a portion of the group of the fields displayed in the graphical user interface in user input. Yet still further, the computer system creates the group of the reports using the portion of the group of the fields. The computer system also sends the group of the reports to an output device, enabling performing an operation for the organization using the group of the reports.

Another embodiment of the present disclosure provides another method for generating reports. A computer system displays an application with fields in a graphical user interface on a display system. The application is used to perform transactions for an organization. The computer system identifies a group of the fields displayed in the graphical user interface that are selectable for use in a group of the reports. Further, the computer system displays a group of graphical indicators in association with the group of the fields in the graphical user interface. Still further, the computer system displays a selection area with a list of the group of the fields. The computer system receives a selection of a portion of the group of the fields made from user input to at least one of the group of the fields displayed in the graphical user interface on the display system or the list displayed in the selection area. Yet still further, the computer system creates the group of the reports using the portion of the group of the fields. The computer system also stores the group of the reports in the graphical user interface on the display system, enabling performing an operation for the organization using the group of the reports.

Yet another embodiment of the present disclosure provides a computer system comprising a display system and a report generator in communication with the display system. The report generator displays an application with fields in a graphical user interface on the display system. The application is used to perform transactions for an organization. The application also identifies a group of the fields displayed in the graphical user interface that is selectable for use in a group of reports. Further, the application displays a group of graphical indicators in association with the group of the fields in the graphical user interface. Still further, the application receives a selection of a portion of the group of the fields displayed in the graphical user interface in user input. Yet still further, the application creates a group of the reports using the portion of the group of the fields. The application also sends the group of the reports to an output device, enabling performing an operation for the organization using the group of the reports.

Still another embodiment of the present disclosure provides computer program product for generating reports. The computer program product comprises a computer-readable storage media, and first program code, second program code, third program code, fourth program code, fifth program code, and sixth program code stored on the computer-readable storage media. The first program code displays an application with fields in a graphical user interface on a display system. The application is used to perform transactions for an organization. The second program code identifies a group of the fields displayed in the graphical user interface that is selectable for use in a group of the reports. The third program code displays a group of graphical indicators in association with the group of the fields in the graphical user interface. The fourth program code receives a selection of a portion of the group of the fields displayed in the graphical user interface in user input. The fifth program code creates the group of the reports using the portion of the group of the fields. The sixth program code sends the group of the reports to an output device, enabling performing an operation for the organization using the group of the reports.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that the process currently used to generate reports may be more cumbersome and difficult than desired. For example, an operator, who desires to generate a report for a transaction being performed using an application, exits or leaves the application and starts a new application for generating reports, such as currently used report generator software.

The illustrative embodiments also recognize and take account that currently available report generator software uses the names of columns, fields, tables, or other data structures in presenting selections to an operator. The illustrative embodiments recognize and take into account that often times, the names used in a database may not be the same as the name of the field as displayed in the application used by the operator to perform the transaction.

Thus, those embodiments provide a method and apparatus for managing reports. In particular, a method may be present that helps an operator generate a new report more quickly and easily as compared to currently available report generator software.

In one illustrative example, a method is present for generating reports. An application with fields is displayed in a graphical user interface on a display system. The application is used to perform transactions for an organization. A group of fields displayed in the graphical user interface that are selectable for use in a group of reports is identified. A group of graphical indicators is displayed in association with the group of the fields in the graphical user interface. A group of selected fields from the group of fields displayed in the graphical user interface is received in a user input. A group of new reports is created using the group of selected fields. The group of new reports is stored in the computer system, enabling performing the operation for an organization using the group of new reports.

As used herein, "a group of," when used with reference to items, means one or more items. For example, "a group of reports" is one or more reports.

A field is a space that holds a piece of data. The space may be, for example, in a location in a record for a database. As another example, the space may be in a location of memory of a computer system. When the space is in an application, the space may be in a data structure in the application.

Figure 1:
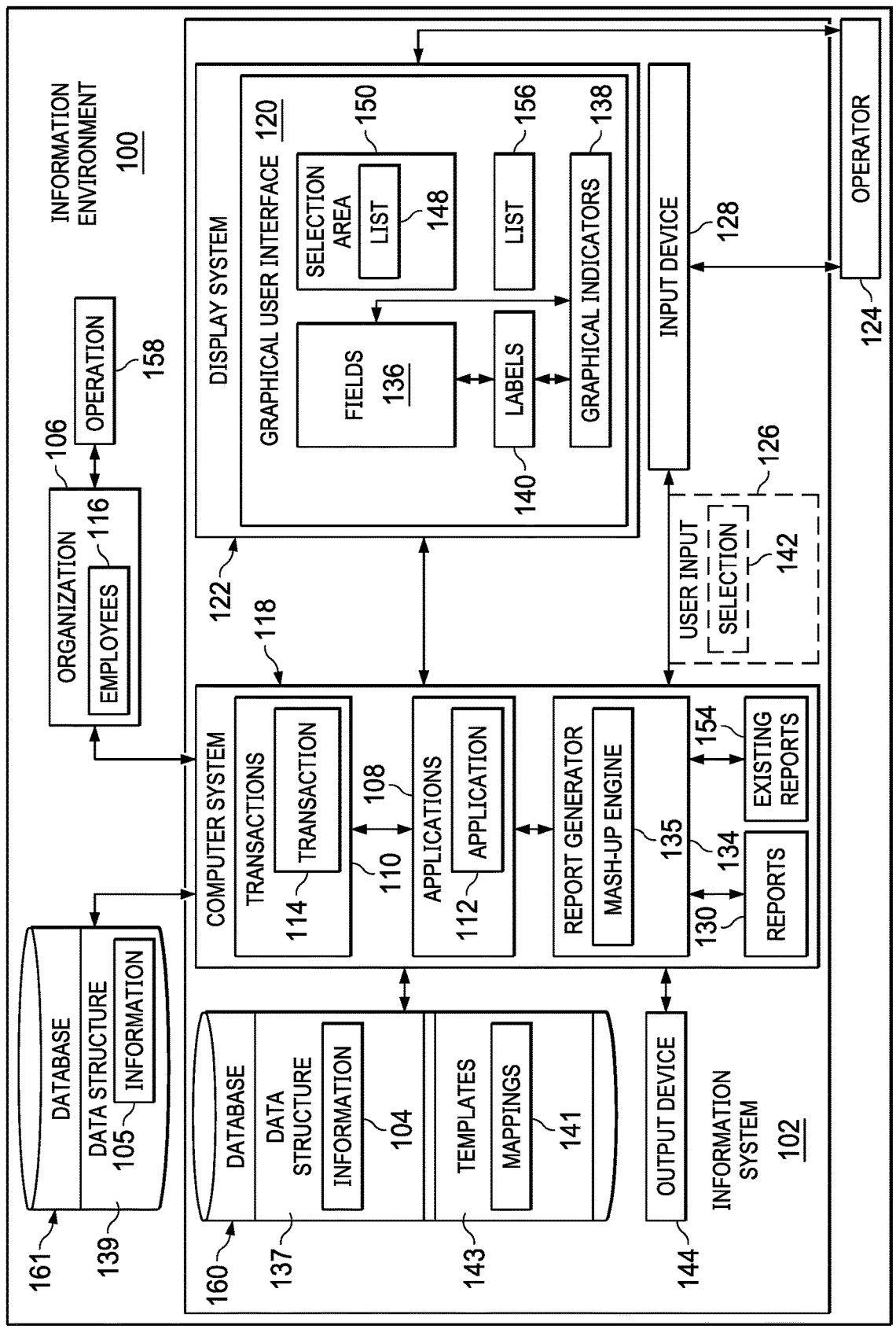
FIG. 1 is a block diagram of an information environment in accordance with an illustrative embodiment.

With reference now to the figures and, in particular, with reference to FIG. 1, a block diagram of an information environment is depicted in accordance with an illustrative embodiment. In this illustrative example, information environment 100 includes information system 102. Information system 102 manages information 104 about organization 106.

Organization 106 may be, for example, a corporation, a partnership, a charitable organization, a city, a government agency, or some other suitable type of organization. Information 104 about organization 106 may include, for example, at least one of information about people, products, research, product analysis, business plans, financials, or other information relating to or used by organization 106.

In this illustrative example, information 104 is stored in database 160 in information system 102. As depicted, information system 102 may be operated by organization 106 or by another party offering services to organization 106.

In this illustrative example, information 105 is stored in database 161. Information 105 is information about organization 106, and may include, for example, at least one of information about people, products, research, product analysis, business plans, financials, or other information relating to or used by organization 106. Information 105 may be generated by one of an employee information system, a research information system, a sales information system, an accounting system, a payroll system, or some other type of system that is externally located from information system 102.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Information system 102 may be selected from one of an employee information system, a research information system, a sales information system, an accounting system, a payroll system, or some other type of information system that stores and provides access to information 104 about organization 106.

Information system 102 may be an upgrade to systems that generate information 105, or may provide services in place of or in addition to the services that generate information 105.

In this illustrative example, information system 102 includes different components. As depicted, information system 102 includes applications 108. As depicted, applications 108 are software used to perform transactions 110 using information system 102.

For example, application 112 in applications 108 may be used to perform transaction 114 in transactions 110. For example, application 112 may be a payroll application. Transaction 114 may be, for example, generating checks for a payroll for employees 116 in organization 106. As another example, application 112 may be a benefits application, and transaction 114 may be an addition of a new hire in employees 116 in organization 106.

In this illustrative example, applications 108 run in computer system 118 and are displayed in graphical user interface 120 in display system 122. Computer system 118 is a hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, a mobile phone, or some other suitable data processing system.

As depicted, display system 122 is a hardware system and includes one or more display devices on which graphical user interface 120 may be displayed. Display system 122 provides a visualization of information 104 to operator 124. The display devices may include at least one of a light emitting diode display (LED), a liquid crystal display (LCD), an organic light emitting diode display (OLED), or some other suitable device on which graphical user interface 120 may be displayed.

In the illustrative example, operator 124 is a human person and interacts with application 112 to perform transaction 114. Operator 124 may interact with graphical user interface 120 through user input 126 generated by input device 128 for computer system 118. Input device 128 may be, for example, a mouse, a keyboard, a trackball, a touchscreen, a stylus, or some other suitable type of input device.

In performing transaction 114, operator 124 may desire to generate a group of reports 130. The group of reports 130 may be generated with respect to transaction 114.

In the illustrative example, information system 102 also includes report generator 134. Report generator 134 is located in computer system 118.

For example, report generator 134 may be located on a client data processing system in computer system 118 that is directly used by operator 124. For example, report generator 134 may be located on a work station, a tablet computer, a mobile phone, or some other client side device.

In another example, report generator 134 may be located on a server computer that is remote to the data processing system used by operator 124. For example, report generator 134 may be part of a service in a cloud computing system in computer system 118 that is accessed by a client data processing system over the Internet. Alternatively, report generator 134 may be distributed between a client data processing system and a server computer.

Report generator 134 may be implemented in software, hardware, firmware, or a combination thereof. When software is used, the operations performed by report generator 134 may be implemented in program code configured to run on hardware, such as a processor unit. When firmware is used, the operations performed by report generator 134 may be implemented in program code and data and stored in persistent memory to run on a processor unit. When hardware is employed, the hardware may include circuits that operate to perform the operations in report generator 134.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Report generator 134 provides a method for generating reports 130. In this illustrative example, report generator 134 displays application 112 with fields 136 in graphical user interface 120 on display system 122. Application 112 is used to perform transactions 110 for organization 106.

Fields 136 are spaces for pieces of data. For example, in a relational database table, the columns of the table are the fields. The rows of the table are records. The records in the table are values for the fields. In this illustrative example, fields 136 are spaces where pieces of data for application 112 are located. These pieces of data are used to perform transactions 110 for organization 106. For example, when application 112 is a payroll application, fields 136 include at least one of salary, tax information, or other suitable types of payroll data.

As depicted, report generator 134 includes mash-up engine 135. Mash-up engine 135 correlates information 105 in database 161 to information 104 in database 160. During operation of mash-up engine 135, mash-up engine 135 locates information about data structure 137 used to store information 104 in database 160. Information about data structure 137 is used to correlate information 104 with information 105. Information about data structure 137 may include, for example, column names, data types, data distribution, and other suitable types of information. In the illustrative example, information about data structure 137 may be a database schema. A database schema is a structure of a database in the illustrative example.

During operation of mash-up engine 135, mash-up engine 135 locates information about data structure 139 used to store information 105 in database 161. Information about data structure 139 is used to correlate information 105 with information 104. Information about data structure 139 may include, for example, column names, data types, data distribution, and other suitable types of information. In the illustrative example, information about data structure 139 may be a database schema. A database schema is a structure of a database in the illustrative example.

In the illustrative example, mash-up engine 135 identifies similarities between data structure 137 and data structure 139. For example, mash-up engine 135 can identify similarities between data structure 137 and data structure 139 based on column names, data types, and data distributions.

In this manner, mash-up engine 135 uses similarities between data structure 137 and data structure 139 to identify mappings 141 between data structure 137 and data structure 139. In this illustrative example, mappings 141 is a data structure that identifies matchings between information 104 and information 105.

Report generator 134 stores mappings 141 as one or more templates 143. Report generator 134 generates reports 130 based on templates 143. Using templates 143, report generator 134 can update reports 130 as additional information is added to one or more of the information 104 and information 105.

As depicted, report generator 134 identifies a group of fields 136 displayed in graphical user interface 120 that is selectable for use in generating a group of reports 130. Report generator 134 displays a group of graphical indicators 138 in association with the group of fields 136 in graphical user interface 120.

In this illustrative example, graphical indicators 138 are considered to be displayed in association with fields 136 when graphical indicators 138 draw attention to fields 136. For example, the group of graphical indicators 138 is selected from at least one of color, font, bolding, underlining, animation, italics, highlighting, an icon, an image, intensity, or some other suitable mechanism for drawing the attention of operator 124 or some other person viewing fields 136 displayed for application 112 in graphical user interface 120.

For example, report generator 134 may display the group of graphical indicators 138 in association with a group of labels 140 for the group of fields 136 that are displayed with the group of fields 136 in graphical user interface 120. As depicted, highlighting, a change in intensity, bolding, or some other sort of graphical indicator may be applied to the group of labels 140 to indicate that the group of fields 136 may be used to generate a group of reports 130. Report generator 134 receives selection 142 of a portion of the group of fields 136 displayed in graphical user interface 120 in user input 126 as generated by operator 124 using input device 128.

Report generator 134 creates a group of reports 130 using a portion of the group of fields 136 that were selected. Report generator 134 sends the group of reports 130 to output device 144. In the illustrative example, output device 144 may take different forms. For example, output device 144 is hardware and may be selected from one of a hard disk, a printer, display system 122, a projector, or some other suitable device.

In another illustrative example, report generator 134 may also provide a visual indication of the group of fields 136 that may be selected through list 148. As depicted, report generator 134 displays selection area 150 with list 148 that includes the group of fields 136.

Selection area 150 may be displayed as part of application 112 displayed in graphical user interface 120. For example, selection area 150 may be a pop-up window, a frame, or some other suitable display mechanism. As depicted, list 148 may be a list of the group of labels 140 for the group of fields 136 that may be selected for use in generating the group of reports 130.

Further, existing reports 154 may be present. Existing reports 154 may have been generated by at least one of operator 124 or another operator. Report generator 134 may also let the operator know if any of existing reports 154 may be used. For example, report generator 134 searches for any of existing reports 154 that have a portion of the group of fields 136. Report generator 134 displays list 156 of existing reports 154 that includes a portion of the group of fields 136. In this manner, a prior report in existing reports 154 may be used rather than operator 124 creating a new report. This feature also may enable at least one of increased uniformity or less duplication in existing reports 154.

In this manner, the use of report generator 134 enables performing operation 158 for organization 106 using the group of reports 130. Operation 158 may be performed with respect to employees 116 or other people in organization 106. Operation 158 may be selected from one of setting compensation, performing a review, assigning a task, hiring, reorganization, purchasing items, shipping items, research for a new product, product planning, or other suitable real world operations.

The illustrative embodiments recognize and take account that this process may be more time-consuming and complex than desired for operator 124. For example, when information 104 for transaction 114 is stored in database 160, operator 124 is required to have knowledge about database 160 in generating the group of reports 130.

In the illustrative example, operator 124 may remain in application 112. For example, selection 142 is made in the display of application 112. The group of graphical indicators 138 is displayed in association with the group of fields 136 that are used by operator 124 to perform transaction 114 using application 112 in information system 102. The selection of fields 136 is made from user input 126 as part of the interaction with application 112.

Thus, the illustrative example provides one or more technical solutions to the technical problem with operators performing transactions being unable to generate reports as efficiently as desired without knowledge about how the information is stored. In the illustrative example, report generator 134 provides visualization of fields 136 as displayed in application 112 along with an indication of which ones of fields 136 may be selected for use in generating the group of reports 130.

As depicted, report generator 134 displays graphical indicators 138 in association with fields 136. Graphical indicators 138 provide a visual indication of which ones of fields 136 may be selected for use in reports 130. This selection may be performed while operator 124 uses application 112. In other words, operator 124 may select one or more fields from the group of fields 136 that are selectable for the group of reports 130 while viewing application 112.

As a result, this technical solution to the technical problem of generating reports provides a technical effect in which a group of reports 130 are generated more easily and quickly while requiring less knowledge or training from operator 124. Additionally, a technical effect is present that increases the ease in which operation 158 may be identified and performed for organization 106.

Computer system 118 is a special purpose computer system in which report generator 134 in computer system 118 enables generating reports 130 more quickly and more efficiently as compared to currently used report generators. In particular, report generator 134, as described, transforms computer system 118 into a special purpose computer system as compared to currently available general computer systems that do not have report generator 134.

Computer system 118 performs a transformation of data to provide a visualization of fields 136 while fields 136 are displayed in application 112. In particular, computer system 118 changes the format of one or more of information 104 and information 105 such that information 104 and information 105 can be used to display reports 130. In the illustrative examples, database 160 and database 161 have different structures for storing information 104. These different structures may include the manner in which data structure 137 and data structure 139 in the databases are organized. In particular, the different databases have different schemas requiring a transformation of one or more of information 104 and information 105 from the format used by one or more of data structure 137 and data structure 139 into the format used by to display reports 130.

As a result, fields 136 are not merely displayed in application 112 in graphical user interface 120. Much more occurs in the display of fields 136. For example, fields 136 that can be selected for use in a group of reports 130 are visually indicated to operator 124. As depicted, this visual indication of fields 136 that may be selected for a group of reports 130 occurs through the use of a group of graphical indicators 138 that are displayed in association with the group of fields 136.

Figure 2:
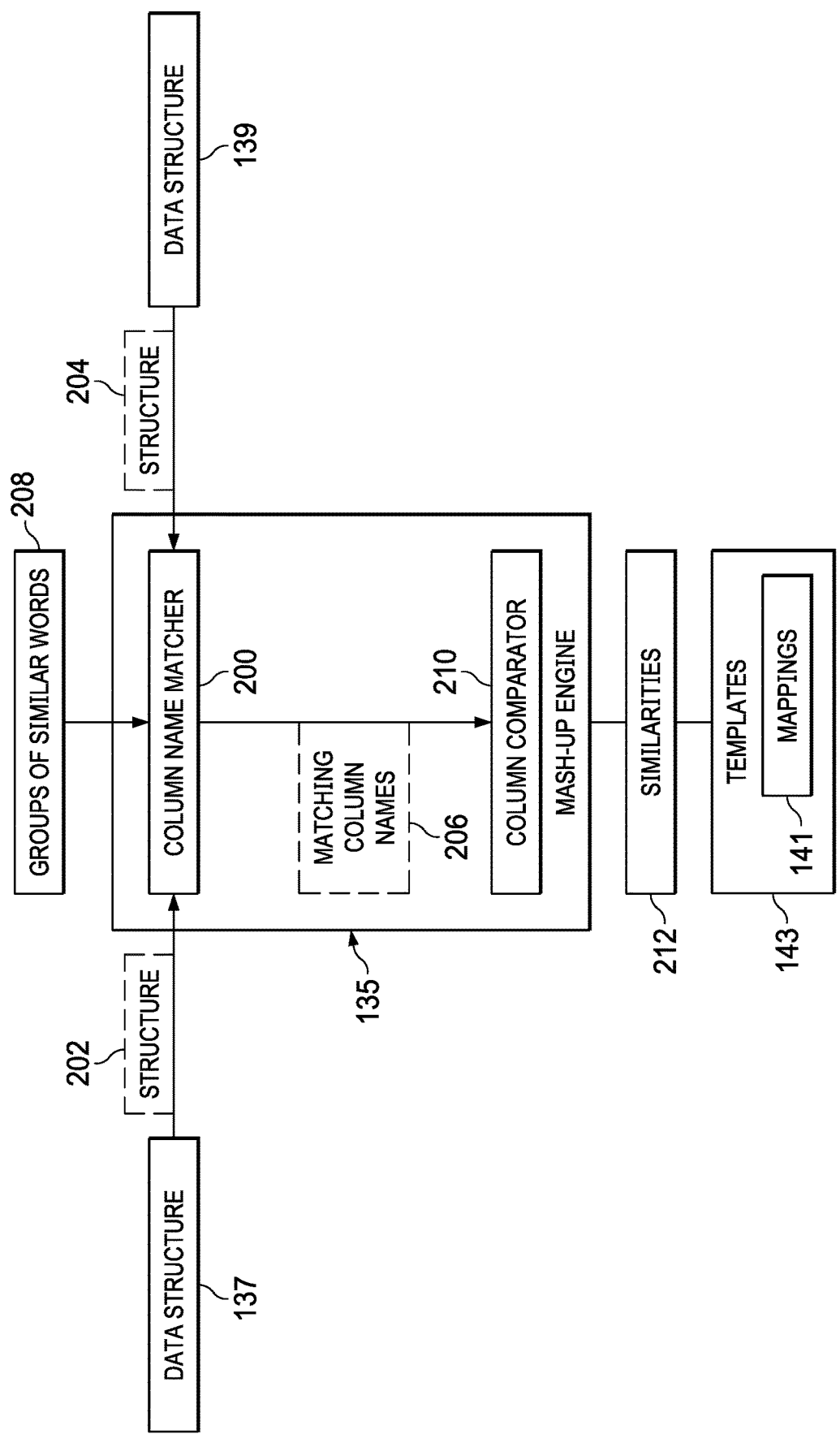
FIG. 2 is a first illustration of a block diagram of a mash-up engine in accordance with an illustrative embodiment.

With reference next to FIG. 2, a first illustration of a block diagram of a mash-up engine is depicted in accordance with an illustrative embodiment. In this figure, examples of components for mash-up engine 135 in FIG. 1 are depicted for determining similarities between columns based on column names. In the illustrative examples, the same reference numeral may be used in more than one figure. This reuse of a reference numeral in different figures represents the same element in the different figures.

In this illustrative example, mash-up engine 135 includes column name matcher 200. As depicted, column name matcher 200 receives structure 202. Structure 202 can be information about data structure 137 used to store information 104, shown in FIG. 1. Column name matcher 200 also receives structure 204. Structure 204 can be information about data structure 139 used to store information 105, shown in FIG. 1.

As depicted, column name matcher 200 identifies matching column names 206 based on words in column names of data structure 137 that match words in column names of data structure 139. In this illustrative example, a column name of data structure 137 matches a column name of data structure 139 when at least one of a group of the words or all of the words in the column name of data structure 137 matches at least one of a group of the words or all of the words in the column name of data structure 139.

In this illustrative example, column name matcher 200 may also use groups of similar words 208 to identify matching column names 206. A group of similar words in groups of similar words 208 is at least one of synonyms, spelling variations, abbreviations, syllables, phrases, translations to other languages, or other suitable types of variations of written text that represent words having a same or similar meaning. In this illustrative example, a first column name matches a second column name when a first portion of the words in the first column and a second portion of the words in the second column match based on a group of words in groups of similar words 208. In the illustrative example, user input may be received to modify a group of similar words in the groups of similar words.

As depicted, mash-up engine 135 also includes column comparator 210. In this illustrative example, column comparator 210 receives matching column names 206 from column name matcher 200. Column comparator 210 then selects the best matches in matching column names 206 as similarities 212. In this illustrative example, the best match is a match selected from a group of matches that has the highest number of matching words in the group of matches. In the depicted example, when none of the matches in the group of matches is based on matching words, the best match is the match with the highest number of similar words.

For example, column comparator 210 may select exact matches between column names as similarities 212 for columns before selecting matches based on column names having similar words. As another example, column comparator 210 may select matches between column names that have the most number of words matching as similarities 212. As still another example, column comparator 210 may select matches between column names based on at least one of spelling variations, abbreviations, translations to other languages, or selected matches based on synonyms. In this fashion, column comparator 210 selects the best matches in matching column names 206 as similarities 212.

In this illustrative example, mash-up engine 135 generates one or more templates 143 based on similarities 212. Templates 143 include mappings 141. Mappings 141 provide an identification of which ones of matching column names 206 that column comparator 210 selects as similarities 212. In this illustrative example, mappings 141 is a data structure that identifies matchings between information 104 and information 105.

Figure 3:
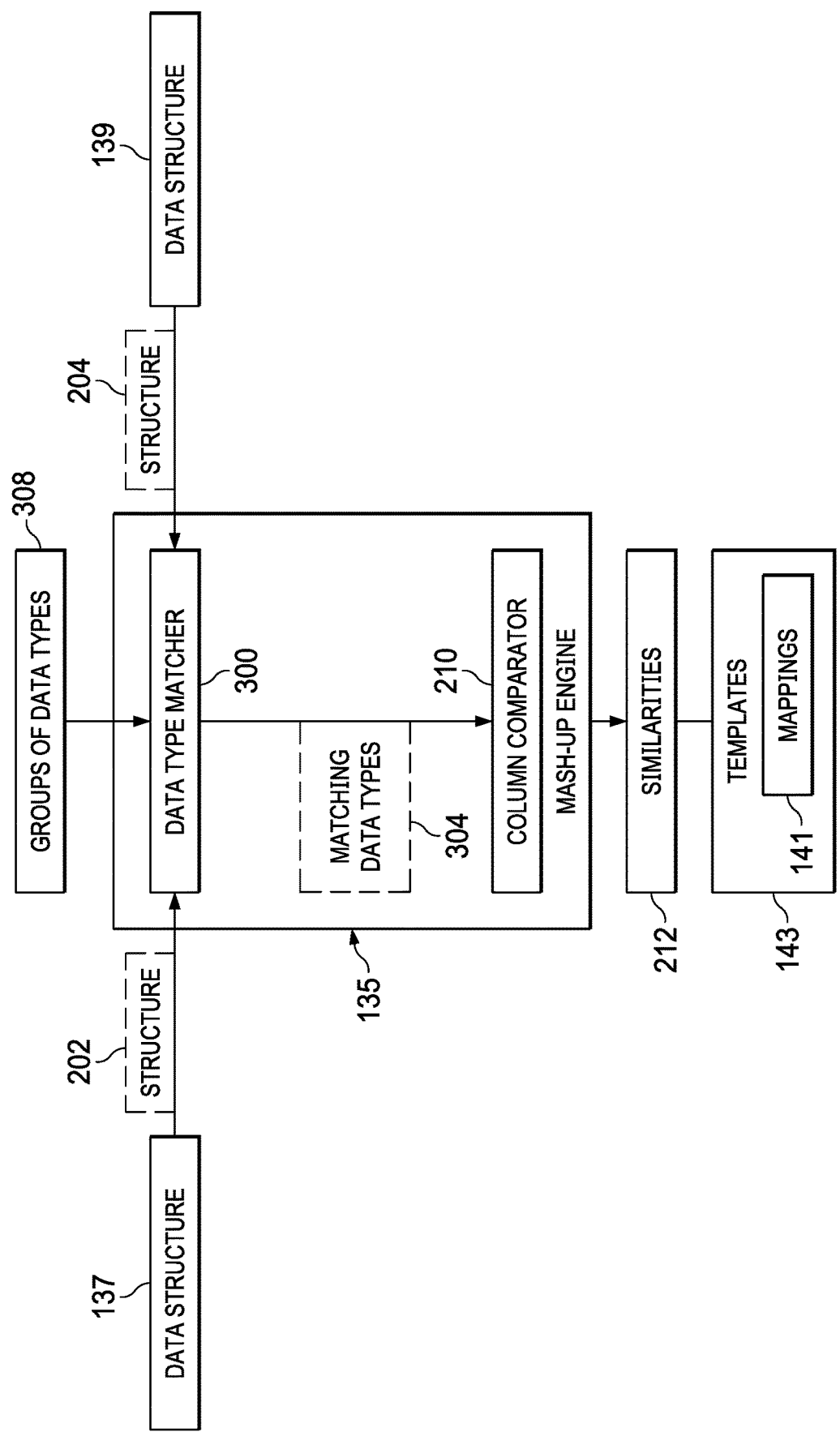
FIG. 3 is a second illustration of a block diagram of a mash-up engine in accordance with an illustrative embodiment.

Turning to FIG. 3, a second illustration of a block diagram of a mash-up engine is depicted in accordance with an illustrative embodiment. In this figure, examples of components for mash-up engine 135 in FIG. 1 are depicted for determining similarities between columns based on data types. The data types compared in FIG. 3 are examples of data types for information 104 and data types for information 105 in FIG. 1. For example, the data types may be selected from at least one of a string, a text, a phone number, a float, an integer, a currency, or other suitable data types.

In this illustrative example mash-up engine 135 includes data type matcher 300. As depicted, data type matcher 300 receives structure 202. Structure 202 can be information about data structure 137 used to store information 104, shown in FIG. 1. Data type matcher 300 also receives structure 204. Structure 204 can be information about data structure 139 used to store information 105, shown in FIG. 1.

As depicted, data type matcher 300 identifies matching data types 304 based on matches between first data types and second data types. In this illustrative example, data type matcher 300 receives structure 202. Structure 202 can be information about data structure 137 used to store information 104, shown in FIG. 1. Data type matcher 300 also receives structure 204. Structure 204 can be information about data structure 139 used to store information 105, shown in FIG. 1. In this illustrative example, a data type of data structure 137 matches a data type of data structure 139 when at least one of a portion of words or all of the words specifying a data type of data structure 137 matches at least one of a portion of words or all of the words specifying a data type of data structure 139.

In this illustrative example, data type matcher 300 may also use groups of similar data types 308 to identify matching data types 304. A group of similar data types in groups of similar data types 308 is a group of two or more data types having a same or similar specification.

In the illustrative example, a first data type is similar to a second data type when the information stored in the first data type can be correlated to the second data type without losing detail. Losing detail means a portion of the information stored in the first data type is not present in the information when it is correlated to the second data type. For example, a phone number stored using a phone number data type can be correlated to a text or string data type without losing detail. As another example, if the first data type is currency and the second data type is an integer, then the data types are said to be incompatible because information would be lost in the correlation. In this illustrative example, the portion of currency known as cents would be lost because an integer does not have decimal places. In this illustrative example, a first data type matches a second data type when the first data type and the second data type are both located in at least one group in groups of data types 308.

As depicted, mash-up engine 135 also includes column comparator 210. In this illustrative example, column comparator 210 receives matching data types 304 from data type matcher 300. Column comparator 210 then selects the best matches in matching data types 304 as similarities 212.

For example, column comparator 210 may select exact matches between data types as similarities 212 for columns before selecting matches based on data types being in a group of similar data types. In this fashion, column comparator 210 selects the best matches in matching data types 304 as similarities 212.

In this illustrative example, mash-up engine 135 generates one or more templates 143 based on similarities 212. Templates 143 includes mappings 141. Mappings 141 provides an identification of which matching data types 304 that column comparator 210 selects as similarities 212. In this illustrative example, mappings 141 is a data structure that identifies matchings between information 104 and information 105.

Figure 4:
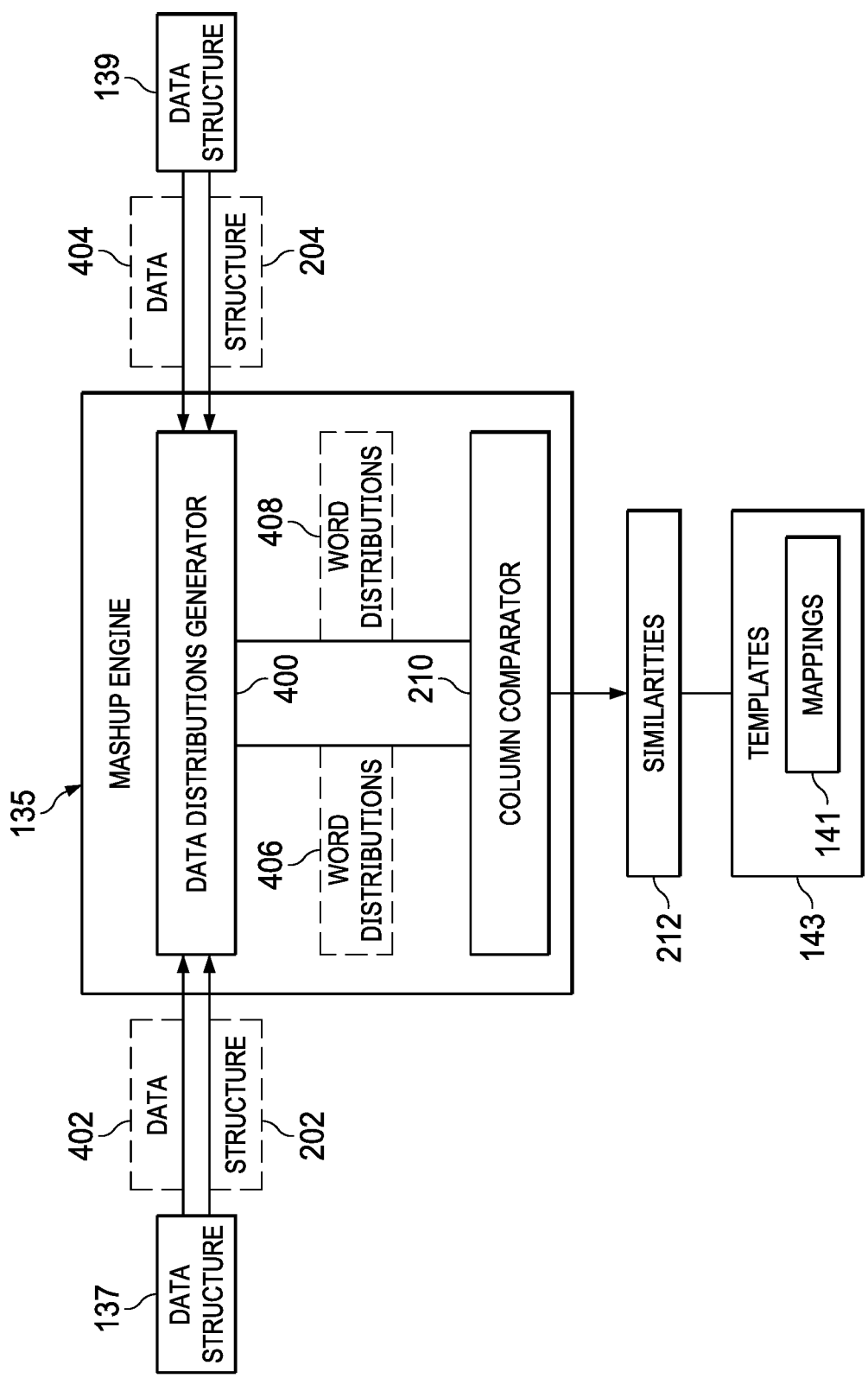
FIG. 4 is a third illustration of a block diagram of a mash-up engine in accordance with an illustrative embodiment.

Turning now to FIG. 4, a third illustration of a block diagram of a mash-up engine is depicted in accordance with an illustrative embodiment. In this illustrative example, mash-up engine 135 includes data distributions generator 400. As depicted, data distributions generator 400 receives data 402 and structure 202. Data 402 is information 104, shown in FIG. 1, stored in data structure 137. Structure 202 can be information about data structure 137 used to store information 104, shown in FIG. 1. Data distributions generator 400 also receives data 404 and structure 204. Data 404 is information 105, shown in FIG. 1, stored in data structure 139. Structure 204 can be information about data structure 139 used to store information 105, shown in FIG. 1.

Data distributions generator 400 identifies columns of data 402 in structure 202 and columns of data 404 in structure 204. As depicted, data distributions generator 400 generates word distributions 406 for columns of data 402 in structure 202. Data distributions generator 400 generates word distributions 408 for columns of data 404 in structure 204. Word distributions are the number of times particular words show up in data. For example, 50 percent of the words in a first column in data 402 may be the word "male" and the other 50 percent may be the word "female." In this illustrative example, data distributions generator 400 generates word distributions 406 and 408 by identifying counts for the number of times each word is present in data for each of the columns.

In this illustrative example, mash-up engine 135 also includes column comparator 210. In this illustrative example, column comparator 210 receives word distributions 406 and word distributions 408 from data distributions generator 400. As depicted, column comparator 210 compares word distributions 406 with word distributions 408 to identify columns in data 402 and columns in data 404 having at least one of a same or a similar distribution of words. Column comparator 210 then selects the best matches between word distributions for columns as similarities 212.

For example, column comparator 210 may select a first column in data 402 and a second column in data 404 as a similarity in similarities 212. In this example, column comparator 210 identifies the similarity between the first column and the second column based on identifying that 50 percent of the words in the first column and second column are the word "male" and the other 50 percent are the word "female."

In this illustrative example, mash-up engine 135 generates one or more templates 143 based on similarities 212. Templates 143 includes mappings 141. Mappings 141 provides an identification of which matching data types 304 that column comparator 210 selects as similarities 212. In this illustrative example, mappings 141 is a data structure that identifies matchings between information 104 and information 105.

Figure 5:
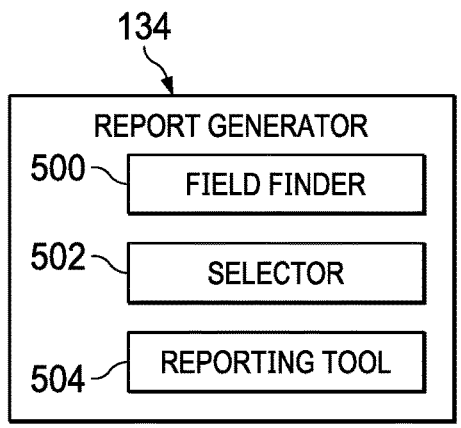
FIG. 5 is a block diagram of a report generator in accordance with an illustrative embodiment.

With reference next to FIG. 5, a block diagram of a report generator is depicted in accordance with an illustrative embodiment. This figure shows one example of an implementation for report generator 134 in FIG. 1. In this illustrative example, report generator 134 has a number of different components. As depicted, report generator 134 includes field finder 500, selector 502, and reporting tool 504. The reuse of a reference numeral in different figures represents the same element in the different figures.

Field finder 500 identifies the group of fields 136 displayed for application 112 in graphical user interface 120 that is selectable for use in the group of reports 130. In this illustrative example, when a field is selectable for use in the group of reports 130, the field may be selected for use as a column in one report of the group of reports 130.

For example, when the field is selected for a report, the output of the report includes the column for the field. When the field is for a column in a relational database table, the output of the report includes the values for the column of records in the table.

As depicted, selector 502 displays the group of graphical indicators 138 in association with the group of fields 136 in graphical user interface 120. Selector 502 also receives selection 142 of a portion of the group of fields 136 displayed in graphical user interface 120.

In this illustrative example, reporting tool 504 creates the group of reports 130 using the portion of the group of fields 136. Reporting tool 504 sends the group of reports 130 to output device 144.

Figure 6:
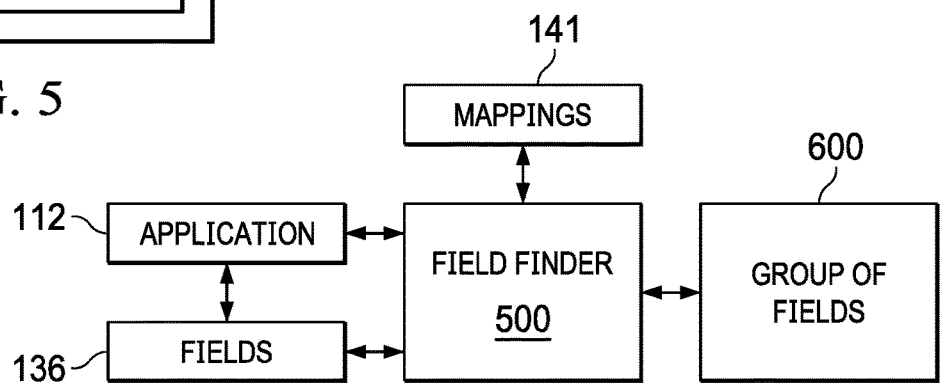
FIG. 6 is a block diagram of data flow for identifying a group of fields of an application in accordance with an illustrative embodiment.

With reference next to FIG. 6, a block diagram of data flow for identifying a group of fields of an application is depicted in accordance with an illustrative embodiment. This figure shows one example of data flow for identifying a group of fields 136 of application 112 through field finder 500 in FIG. 5.

In this figure, an example of data flow for identifying group of fields 600 that is selectable for use in group of reports 130 through field finder 500 is shown. As shown in this figure, field finder 500 identifies group of fields 600 using mappings 141. In this illustrative example, mappings 141 is a data structure that identifies matchings between information 104 and information 105 of FIG. 1 based on similarities 212.

Figure 7:
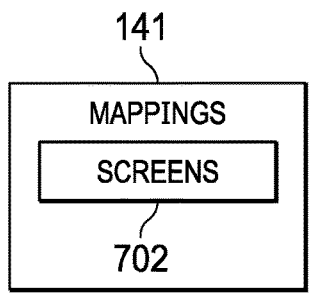
FIG. 7 is a block diagram of mapping in accordance with an illustrative embodiment.

With reference now to FIG. 7, a block diagram of mapping is depicted in accordance with an illustrative embodiment. In this illustration, mappings 141 includes a group of screens 702 for application 112.

In this illustrative example, the group of screens 702 for application 112 are groups of fields displayed in graphical user interface 120. The group of screens 702 is used to perform transactions 110. For example, when application 112 is a payroll application, screens 702 for application 112 may include at least one of a screen for generating payroll checks, a screen for generating tax forms, or other suitable types of screens for payroll applications.

Figure 8:
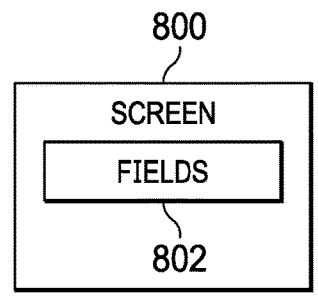
FIG. 8 is a block diagram of a screen in accordance with an illustrative embodiment.

Turning to FIG. 8, an illustration of a block diagram of a screen is depicted in accordance with an illustrative embodiment. In this illustration, screen 800 is an example of a screen in the group of screens 702 in mappings 141 in FIG. 7.

As depicted, screen 800 includes a group of fields 802. The group of fields 802 for screen 800 is an example of fields 136 for application 112 in FIG. 1. For example, when screen 800 is for generating payroll checks, the group of fields 802 is one or more fields displayed on graphical user interface 120 for entering the payroll checks on screen 800 for application 112.

Figure 9:
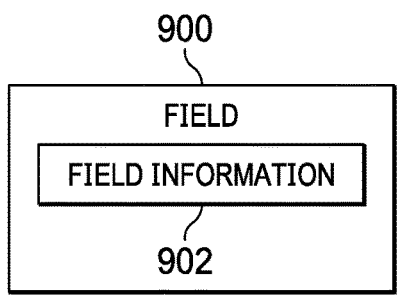
FIG. 9 is a block diagram of a field in accordance with an illustrative embodiment.

Turning next to FIG. 9, a block diagram of a field is depicted in accordance with an illustrative embodiment. In this illustration, field 900 is an example of a field in the group of fields 802 in screen 800 in FIG. 8.

In this illustrative example, field 900 includes field information 902. As depicted, field information 902 is information used by report generator 134 to at least one of identify whether field 900 is the group of fields 136 that are selectable for generating the group of reports 130, or identify a group of functions for field 900 that are selectable for generating information relating to field 900 for the group of reports 130.

Figure 10:
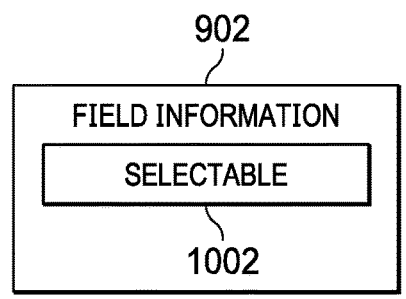
FIG. 10 is a block diagram of field information in accordance with an illustrative embodiment.

Turning now to FIG. 10, an illustration of a block diagram of field information is depicted in accordance with an illustrative embodiment. In this illustration, field information 902 includes selectable 1002.

As depicted, selectable 1002 is a value that indicates whether field 900 is selectable for use in the group of reports 130. When the value for selectable 1002 is true, field 900 is selectable for use in the group of reports 130. When the value for selectable 1002 is false, field 900 is not selectable for use in the group of reports 130.

Figure 11:
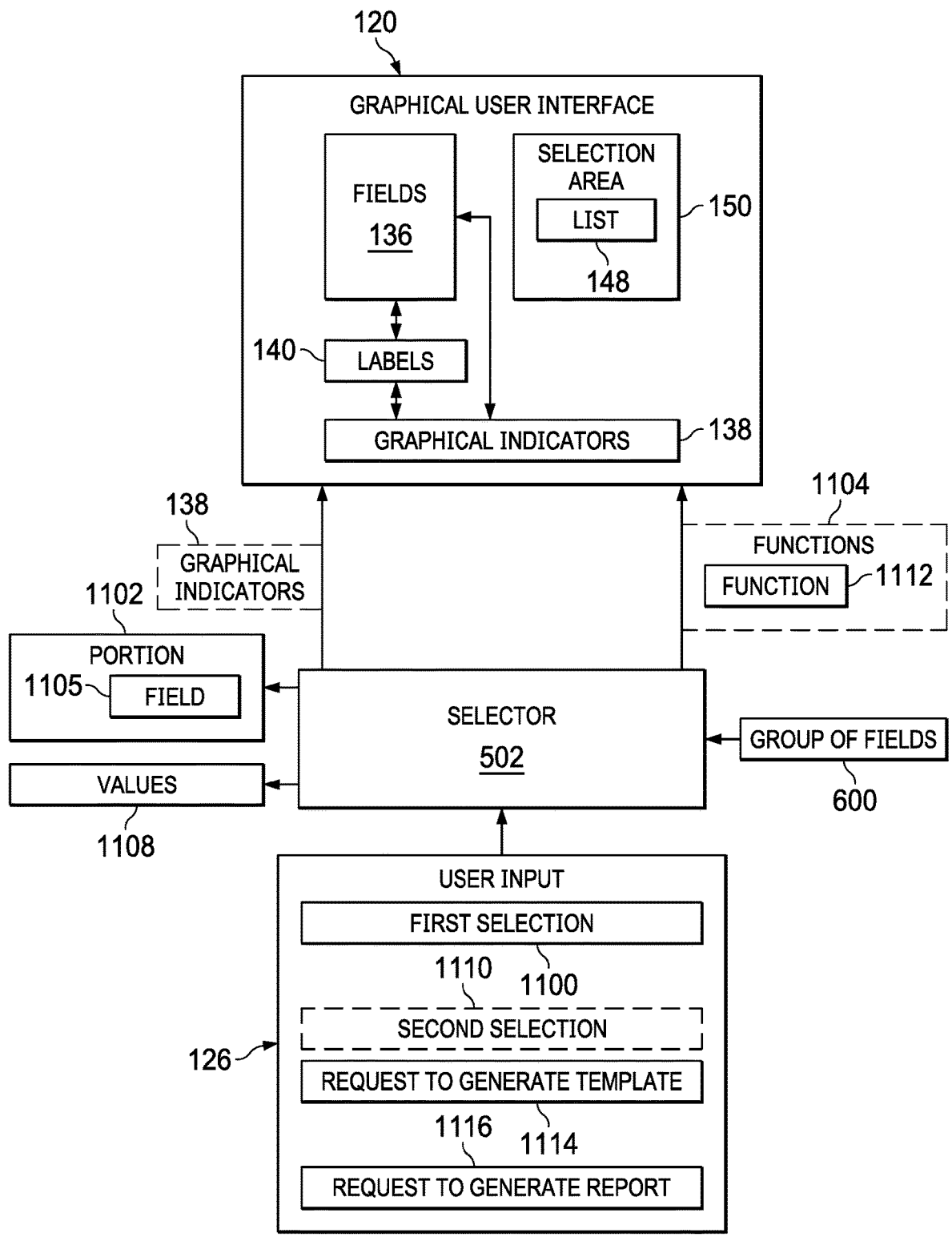
FIG. 11 is a block diagram of data flow for displaying a group of graphical indicators in association with a group of fields of an application in accordance with an illustrative embodiment.

With reference to FIG. 11, a block diagram of data flow for displaying a group of graphical indicators in association with a group of fields of an application is depicted in accordance with an illustrative embodiment. In this figure, an example of data flow for generating the group of templates 143 in FIG. 1 is shown.

In this illustrative example, selector 502 displays the group of graphical indicators 138 in graphical user interface 120 in association with the group of labels 140 for group of fields 600. For example, selector 502 may display the group of graphical indicators 138 in graphical user interface 120 when selector 502 receives group of fields 600 from field finder 500. Selector 502 displays the group of graphical indicators 138 to indicate that group of fields 600 displayed in graphical user interface 120 are selectable for use in generating the group of reports 130.

Selector 502 also receives first selection 1100 of portion 1102 of group of the fields 600 displayed in graphical user interface 120. First selection 1100 is an example of selection 142 in FIGS. 1-4. In this illustrative example, portion 1102 is a group of fields selected from group of fields 600.

Selector 502 modifies the group of graphical indicators 138 in graphical user interface 120 for portion 1102. Selector 502 modifies the group of graphical indicators 138 to indicate portion 1102 of group of fields 600 that is selected for use in generating the group of reports 130. For example, selector 502 may set labels 140 for fields 136 in portion 1102 to a first color and labels 140 for fields 136 not in portion 1102 to a second color.

In this illustrative example, selector 502 places the group of labels 140 for portion 1102 of group of fields 600 in list 148. As depicted, selector 502 displays list 148 in selection area 150 on graphical user interface 120. List 148 indicates which of fields 136 are selectable for generating the group of reports 130. First selection 1100 is selected from at least one of the group of graphical indicators 138 displayed on graphical user interface 120 for group of fields 600, the group of labels 140 displayed on graphical user interface 120 for group of fields 600, or the group of labels 140 placed in list 148 for group of fields 600.

As depicted, portion 1102 includes field 1105. Selector 502 displays a group of functions 1104 for field 1105 on graphical user interface 120. Selector 502 displays the group of functions 1104 when selector 502 receives first selection 1100.

In this illustrative example, the group of functions 1104 is selected from at least one of statistical functions, retrieval functions, or some other suitable type of functions that generate the group of values 1108 for field 1105. A statistical function calculates at least one of a sum, a mean, a median, a mode, or some other suitable type of statistical value. Retrieval functions are functions that get values from another source. For example, a retrieval function may retrieve the group of values 1108 from at least one of a database, the Internet, or some other suitable source.

Selector 502 receives second selection 1110 in user input 126. Second selection 1110 selects function 1112 in the group of functions 1104 for field 1105. In this illustrative example, selector 502 uses function 1112 to generate a group of values 1108 for field 1105 for the group of reports 130.

For example, when field 1105 is salary of employees 116 and function 1112 is the statistical function for mean, the group of values 1108 is calculated as the mean for the salaries for employees 116. As another example, when field 1105 is an industry average salary comparison to the salary of employees 116 and function 1112 is a retrieval function for industry average salaries, the group of values 1108 may be retrieved from a service that provides industry average salaries for employees.

In this illustrative example, user input 126 includes request to generate template 1114. As depicted, selector 502 receives request to generate template 1114. When selector 502 receives request to generate template 1114, selector 502 sends portion 1102 and function 1112 to reporting tool 504 to use in creating templates 143.

In this illustrative example, user input 126 includes request to generate report 1116. As depicted, selector 502 receives request to generate report 1116. When selector 502 receives request to generate report 1116, selector 502 sends portion 1102 and the group of values 1108 for field 1105 to reporting tool 504 to use in creating the group of reports 130.

Figure 12:
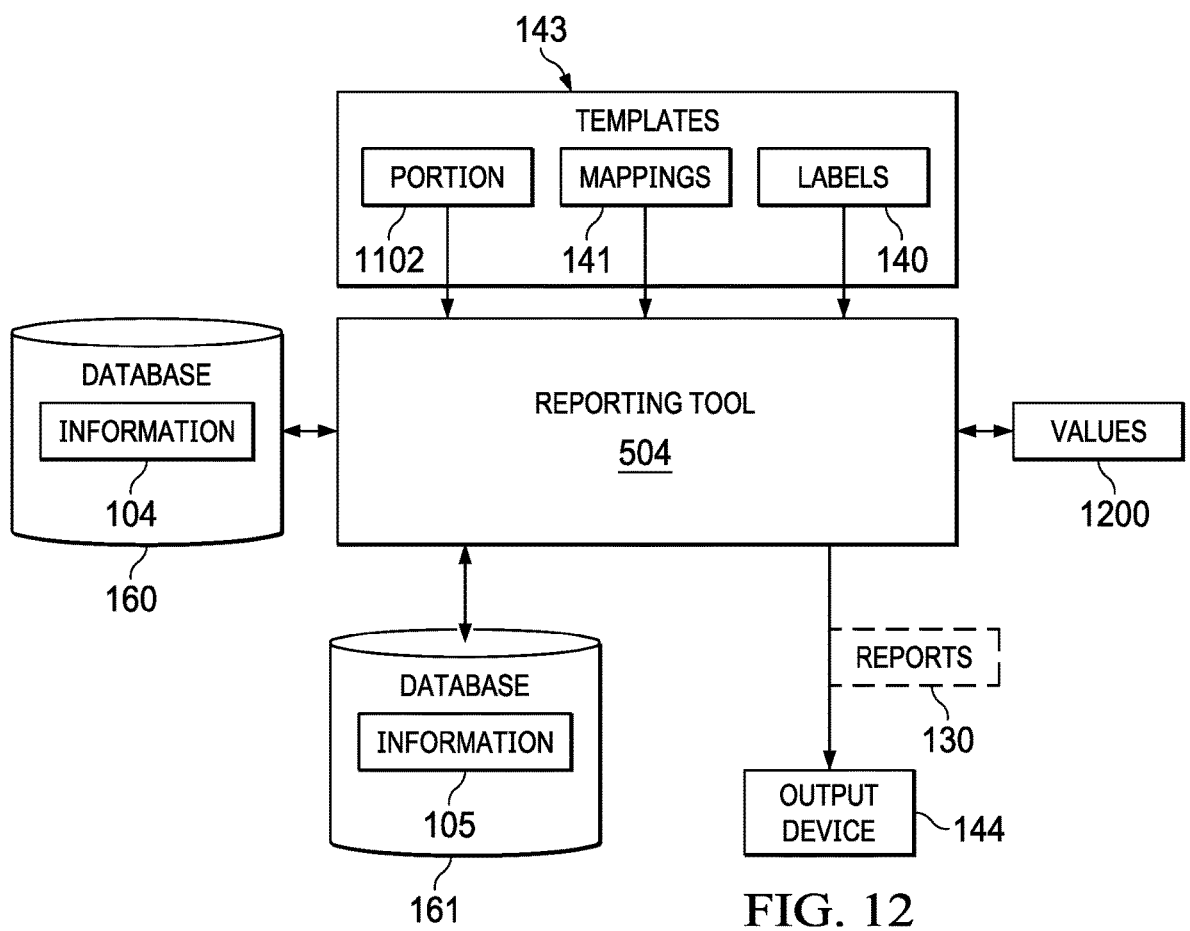
FIG. 12 is a block diagram of data flow for creating reports in accordance with an illustrative embodiment.

With reference next to FIG. 12, an illustration of a block diagram of data flow for creating reports is depicted in accordance with an illustrative embodiment. In this figure, an example of data flow for creating the group of reports 130 using portion 1102 of group of fields 600 through reporting tool 504 is shown.

In this illustrative example, reporting tool 504 receives portion 1102 of group of fields 600 from templates 143. Reporting tool 504 identifies a group of values 1200 for portion 1102 of group of fields 600 based on mappings 141 in templates 143.

For example, reporting tool 504 may retrieve the group of values 1200 for portion 1102 from one or more of information 104 in database 160 and information 105 in database 161. In this example, reporting tool 504 may use structured query language (SQL) select statements to retrieve columns of information 104 in database 160 and corresponding columns of information 105 in database 161 for portion 1102 of group of fields 600.

Reporting tool 504 creates the group of reports 130 using templates 143 and the group of values 1200. For example, a report in the group of reports 130 may be a table. In this illustrative example, reporting tool 504 may generate the table using portion 1102 of group of fields 600 as the columns of the table, the group of values 1200 as the values in the table, and the group of labels 140 for portion 1102 as the headings for the columns of the table.

As depicted, reporting tool 504 sends the group of reports 130 to output device 144. For example, reporting tool 504 may send the group of reports 130 to output device 144 while reporting tool 504 is creating the group of reports 130.

The illustrations of information environment 100 and the different components in FIGS. 1-12 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, selection area 150 may be displayed in place of the group of graphical indicators 138 displayed in association with the group of fields 136. As another example, although report generator 134 is shown as a separate block, this function may be implemented as part of application 112.

As another example, report generator 134 also may be distributed through or in communication with application 112. As a result, operator 124 may select fields 136 not only for application 112 but for any of applications 108. In this manner, operator 124 may move from application to application in applications 108 as needed to see the group of fields 136 that are selectable in applications 108 that may be used to form a group of reports 130. The visualization of fields 136, labels 140 for fields 136, or both may allow operator 124 to more easily generate a group of reports. For example, the visualization of at least one of labels 140 or fields 136 in the context of the use of at least one of labels 140 or fields 136 in application 112 or throughout applications 108 may aid operator 124 in knowing which ones of the group of fields 136 are to be selected for generating reports 130.

Figure 13:
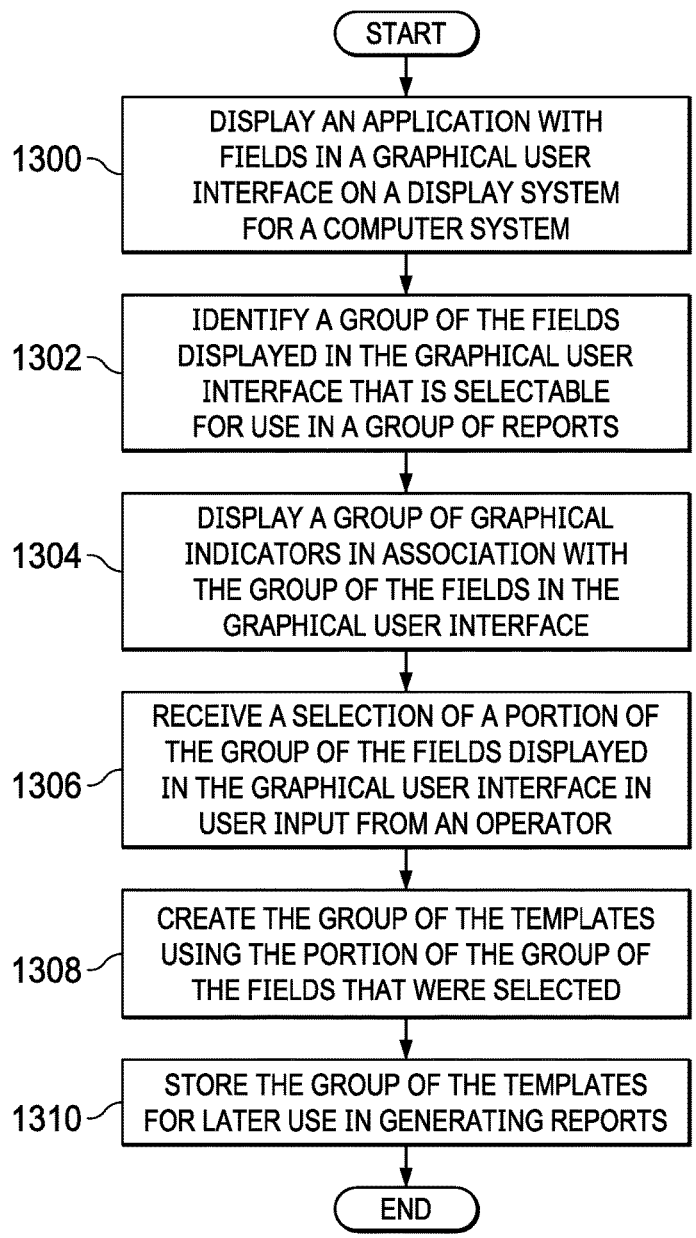
FIG. 13 is a flowchart of a process for generating templates in accordance with an illustrative embodiment.

Turning next to FIG. 13, a flowchart of a process for generating templates is depicted in accordance with an illustrative embodiment. The process illustrated in FIG. 13 may be implemented in information system 102 in FIG. 1. For example, the process may be implemented in report generator 134 in FIG. 1.

The process begins by displaying an application with fields in a graphical user interface on a display system for a computer system (step 1300). The application is used to perform transactions for an organization in this illustrative example. The process identifies a group of the fields displayed in the graphical user interface that is selectable for use in a group of reports (step 1302). In other words, the fields in step 1302 can be selected for use in a report.

The process displays a group of graphical indicators in association with the group of the fields in the graphical user interface (step 1304). The process receives a selection of a portion of the group of the fields displayed in the graphical user interface in user input from an operator (step 1306).

Next, the process creates the group of the templates using the portion of the group of the fields that were selected (step 1308). The process stores the group of the templates for later use in generating reports (step 1310), with the process terminating thereafter. The output device may be a hard disk or some other hardware storage system for a database. In another example, the output device may be printer, a display system, a projector, or some other hardware device.

Figure 14:
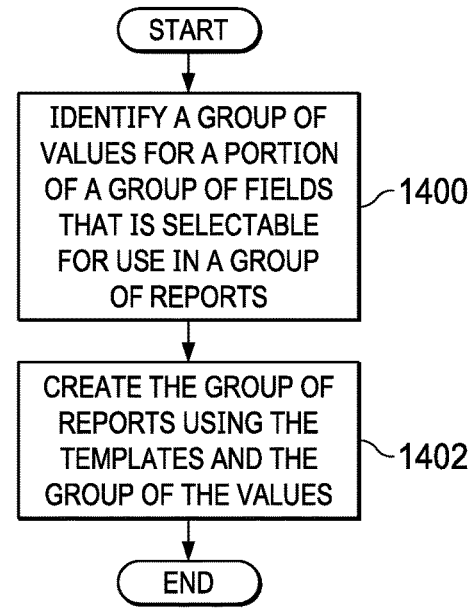
FIG. 14 is a flowchart of a process for creating reports in accordance with an illustrative embodiment.

Turning next to FIG. 14, a flowchart of a process for creating reports is depicted in accordance with an illustrative embodiment. The process illustrated in FIG. 14 may be implemented in information system 102 in FIG. 1. For example, the process may be implemented in report generator 134 in FIG. 1.

The process begins by identifying a group of values for a portion of a group of fields that is selectable for use in a group of reports (step 1400). For example, the process may retrieve the group of values for the portion of information in one or more databases according to mappings 141 in one or more templates 143. When the group of values is located in database 160, the process may use structured query language (SQL) select statements to retrieve columns of information in database 160 for the portion of the group of the fields. As another example, the process may use a group of functions selected for the portion to generate the group of the values for the portion.

The process then creates the group of reports using the templates and the group of the values (step 1402), with the process terminating thereafter. For example, when a report in the group of reports is a table, the process may generate the table using the portion of the group of fields as the columns of the table, the group of values as the values in the table, and a group of labels for the portion as the headings for the columns of the table.

In this manner the process enables performing the operation for an organization using the group of the reports more efficiently. The efficiency may occur through the ability to visualize the fields and their use in application and selecting fields based on the visualization rather than needing knowledge of how the fields are organized in storage such as in a database.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 15:
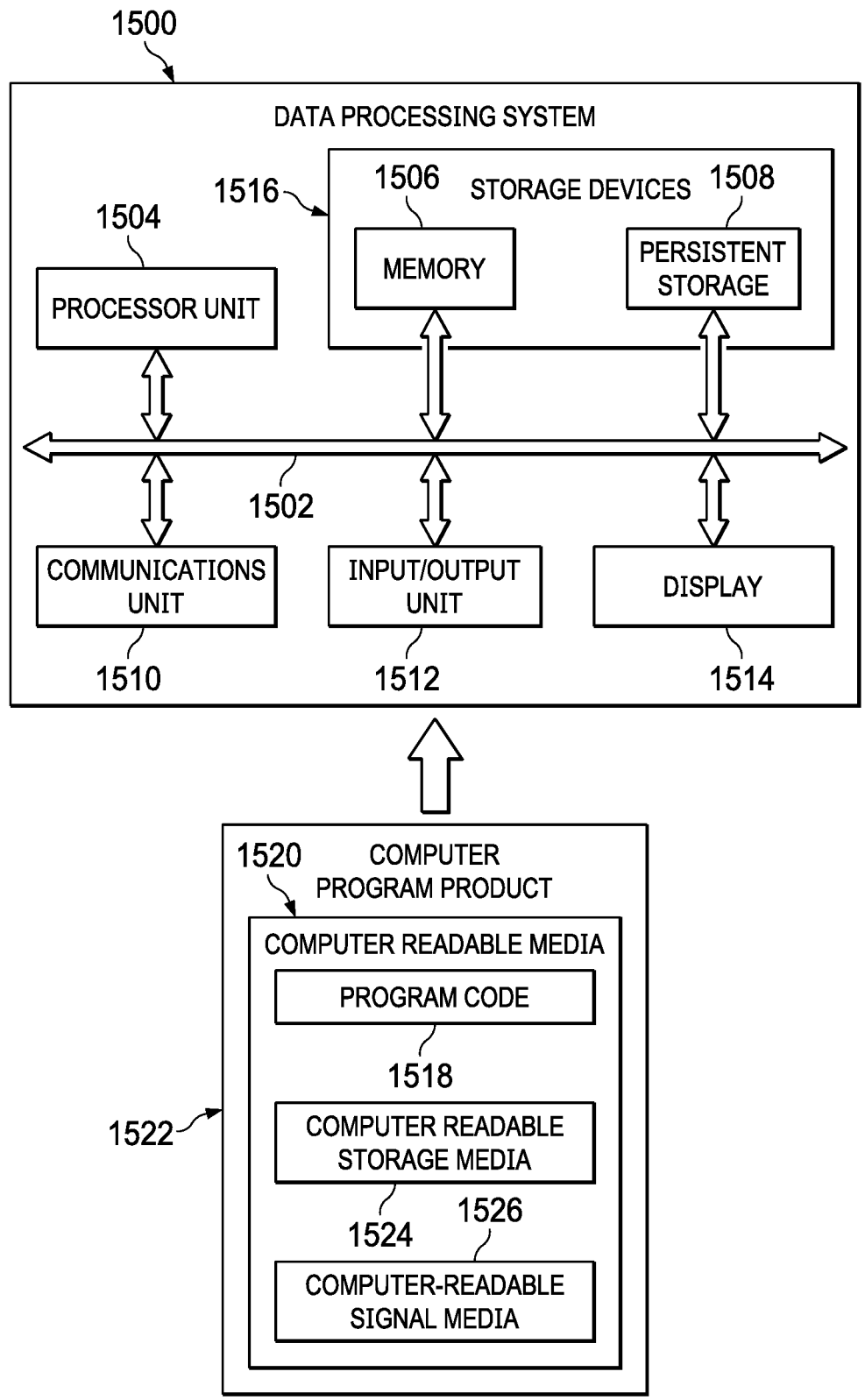
FIG. 15 is a data processing system in accordance with an illustrative embodiment.

Turning now to FIG. 15, a block diagram of a data processing system is depicted in accordance with an illustrative embodiment. Data processing system 1500 may be used to implement computer system 118. In this illustrative example, data processing system 1500 includes communications framework 1502, which provides communications between processor unit 1504, memory 1506, persistent storage 1508, communications unit 1510, input/output (I/O) unit 1512, and display 1514. In this example, communications framework 1502 may take the form of a bus system.

Processor unit 1504 serves to execute instructions for software that may be loaded into memory 1506. Processor unit 1504 may be a number of processors, a multi-processor core, or some other type of processor, depending on the particular implementation.

Memory 1506 and persistent storage 1508 are examples of storage devices 1516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1516 may also be referred to as computer-readable storage devices in these illustrative examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that may be connected to data processing system 1500. For example, input/output unit 1512 may provide a connection for user input through at least of a keyboard, a mouse, or some other suitable input device. Further, input/output unit 1512 may send output to a printer. Display 1514 provides a mechanism to display information to a user.

Instructions for at least one of the operating system, applications, or programs may be located in storage devices 1516, which are in communication with processor unit 1504 through communications framework 1502. The processes of the different embodiments may be performed by processor unit 1504 using computer-implemented instructions, which may be located in a memory, such as memory 1506.

These instructions are referred to as program code, computer usable program code, or computer-readable program code that may be read and executed by a processor in processor unit 1504. The program code in the different embodiments may be embodied on different physical or computer-readable storage media, such as memory 1506 or persistent storage 1508.

Program code 1518 is located in a functional form on computer-readable media 1520 that is selectively removable and may be loaded onto or transferred to data processing system 1500 for execution by processor unit 1504. Program code 1518 and computer-readable media 1520 form computer program product 1522 in these illustrative examples. In one example, computer-readable media 1520 may be computer-readable storage media 1524 or computer-readable signal media 1526. In these illustrative examples, computer-readable storage media 1524 is a physical or tangible storage device used to store program code 1518 rather than a medium that propagates or transmits program code 1518.

Alternatively, program code 1518 may be transferred to data processing system 1500 using computer-readable signal media 1526. Computer-readable signal media 1526 may be, for example, a propagated data signal containing program code 1518. For example, computer-readable signal media 1526 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1500 are not meant to provide architectural limitations to the manner in which different embodiments may be implemented. The different illustrative embodiments may be implemented in a data processing system including components in addition to or in place of those illustrated for data processing system 1500. Other components shown in FIG. 15 can be varied from the illustrative examples shown. The different embodiments may be implemented using any hardware device or system capable of running program code 1518.

Thus, one or more of the illustrative examples that solves the technical problem with operators performing transactions being unable to generate reports as efficiently as desired without knowledge about how the information is stored.

In one illustrative example, a report generator system allows an operator to select a field for reports. The selection occurs while the operator is in an application used to generate a transaction that has information that may be used in a report. The operator may select fields before performing operations in the application for the transaction, while performing the operations, after performing the operations and completes the transaction, or some combination thereof.

As a result, the operator may select fields for a report without having to leave the application to go to a specialized reporting program.

Further, the user is able to visualize the fields with labels for the fields that are familiar to the user as opposed to labels that are used in a database. In other words, the labels for the fields displayed with the information of interest for reports may not be the same as the labels used in a database for the information of interest.

In the illustrative example, the fields that can be selected are emphasized by graphical indicators associated with the fields. The emphasis may be, for example, highlighting or changing a color of labels for the fields, or some other suitable type of emphasis.

Thus, this technical solution has a technical effect that enables an operator to generate a report more efficiently. Additionally, the technical solution also may enable an operator to more easily generate a report without having knowledge about the manner in which the information is stored.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for generating reports comprising;
   displaying, by a computer system, an application with fields in a graphical user interface on a display system, wherein the application is used to perform transactions for an organization;
   generating, by the computer system, a template that maps columns of data between different data structures based on correlating similarities between column names, data types, and data distributions of the different data structures, wherein the data distributions include intra-column word distributions;
   identifying, by the computer system, a group of the fields based on the template, wherein the group of the fields is selectable for use in a group of the reports;
   displaying, by the computer system, a group of graphical indicators in association with the group of the fields in the graphical user interface, wherein the fields of the application are located in a group of screens for the application, wherein a selection area is added to at least one of the group of screens of the application when an icon in the graphical user interface is selected, and wherein the selection area is selected from at least one of a pop-up window or a frame in a screen for the application;
   receiving, by the computer system, user input that selects a portion of the group of the fields displayed in the graphical user interface;
   identifying, by the computer system, a group of values for the portion of the group of fields based on mappings in the template;
   creating, by the computer system, the group of the reports using the portion of the group of the fields and the values identified from the different data structures; and
   sending, by the computer system, the group of the reports to an output device, enabling performing an operation for the organization using the group of the reports.

2. The method of claim 1 further comprising:
   displaying, by the computer system, a selection area with a list of the group of the fields.

3. The method of claim 1 further comprising:
   displaying, by the computer system, a list of existing reports that includes at least one of the portion of the group of the fields.

4. The method of claim 1, wherein displaying the group of graphical indicators in association with the group of the fields comprises:
   displaying, by the computer system, the group of graphical indicators in association with a group of labels for the group of the fields that are displayed with the group of the fields in the graphical user interface.

5. The method of claim 1, wherein the group of graphical indicators is selected from at least one of color, font, bolding, underlining, animation, italic, highlighting, an icon, an image, or intensity.

6. The method of claim 1, wherein the application includes a mapping that identifies which ones of the fields are selectable for use in the group of the reports.

7. The method of claim 1, wherein the selection is a first selection and further comprising:
   displaying, by the computer system, a group of functions for a field in the portion of the group of the fields that are selectable when the field is selected for the group of the reports;
   receiving, by the computer system, a second selection of a function from the group of the functions in the user input, wherein the function generates information relating to the field;
   generating, by the computer system, the information using the function; and
   including, by the computer system, the information generated by the function in the group of the reports.

8. A method for generating reports comprising:
   displaying, by a computer system, an application with fields in a graphical user interface on a display system, wherein the application is used to perform transactions for an organization;
   generating, by a computer system, a template that maps columns of data between different data structures based on correlating similarities between column names, data types, and data distributions of the different data structures, wherein the data distributions include intra-column word distributions;
   identifying, by the computer system, a group of the fields based on the template, wherein the group of the fields is selectable for use in a group of the reports;
   displaying, by the computer system, a group of graphical indicators in association with the group of the fields in the graphical user interface, wherein the fields of the application are located in a group of screens for the application, wherein a selection area is added to at least one of the group of screens of the application when an icon in the graphical user interface is selected, and wherein the selection area is selected from at least one of a pop-up window or a frame in a screen for the application;

displaying, by the computer system, a selection area with a list of the group of the fields;

receiving, by the computer system, a selection of a portion of the group of the fields made from user input to at least one of the group of the fields displayed in the graphical user interface on the display system or the list displayed in the selection area;

identifying, by the computer system, a group of values for the portion of the group of fields based on mappings in the template;

creating, by the computer system, the group of the reports using the portion of the group of the fields and the values identified from the different data structures; and storing the group of the reports in the graphical user interface on the display system, enabling performing an operation for the organization using the group of the reports.

9. A computer system comprising:
a display system; and
a report generator in communication with the display system, wherein the report generator:
displays an application with fields in a graphical user interface on the display system, wherein the application is used to perform transactions for an organization;
generates a template that maps columns of data between different data structures based on correlating similarities between column names, data types, and data distributions of the different data structures wherein the data distributions include intra-column word distributions;
identifies a group of the fields based on the template, wherein the group of the fields is selectable for use in a group of the reports;
displays a group of graphical indicators in association with the group of the fields in the graphical user interface, wherein the fields of the application are located in a group of screens for the application, wherein a selection area is added to at least one of the group of screens of the application when an icon in the graphical user interface is selected, and wherein the selection area is selected from at least one of a pop-up window or a frame in a screen for the application;
receives user input that selects a portion of the group of the fields displayed in the graphical user interface;
identifies a group of values for the portion of the group of fields based on mappings in the template;
creates the group of the reports using the portion of the group of the fields and the values identified from the different data structures; and
sends a group of reports to an output device, enabling performing an operation for the organization using the group of reports.

10. The computer system of claim 9, wherein the report generator displays a selection area with a list of the group of the fields.

11. The computer system of claim 9, wherein the report generator displays a list of existing reports that includes at least one of the portion of the group of the fields.

12. The computer system of claim 9, wherein in displaying the group of graphical indicators in association with the group of the fields, the report generator displays the group of graphical indicators in association with a group of labels for the group of the fields that are displayed with the group of the fields in the graphical user interface.

13. The computer system of claim 9, wherein the group of graphical indicators is selected from at least one of color, font, bolding, underlining, animation, italic, highlighting, an icon, an image, or intensity.

14. The computer system of claim 9, wherein the report generator is a service in a cloud computing system that is accessed by a client data processing system.

15. The computer system of claim 9, wherein the application includes a mapping that identifies which ones of the fields are selectable for use in the group of reports.

16. The computer system of claim 9, wherein the selection is a first selection and wherein the report generator displays a group of functions for a field in the portion of the group of the fields that are selectable when the field is selected for the group of reports; receives a second selection of a function from the group of the functions in the user input, wherein the function generates information relating to the field; generates the information using the function;
and includes the information generated by the function in the group of the reports.

17. A computer program product for generating reports, the computer program product comprising:
a computer-readable storage media;
program code, stored on the computer-readable storage media, for displaying an application with fields in a graphical user interface on a display system, wherein the application is used to perform transactions for an organization;
program code, stored on the computer-readable storage media, for generating a template that maps columns of data between different data structures based on correlating similarities between column names, data types, and data distributions, wherein the data distributions include intra-column word distributions of the different data structures wherein the data distributions include intra-column word distributions;
program code, stored on the computer-readable storage media, for identifying a group of the fields based on the template, wherein the group of the fields is selectable for use in a group of the reports;
program code, stored on the computer-readable storage media, for displaying a group of graphical indicators in association with the group of the fields in the graphical user interface wherein the fields of the application are located in a group of screens for the application, wherein a selection area is added to at least one of the group of screens of the application when an icon in the graphical user interface is selected, and wherein the selection area is selected from at least one of a pop-up window or a frame in a screen for the application;
program code, stored on the computer-readable storage media, for receiving user input that selects a portion of the group of the fields displayed in the graphical user interface;
program code, stored on the computer-readable storage media, for identifying a group of values for the portion of the group of fields based on mappings in the template;
program code, stored on the computer-readable storage media, for creating the group of the reports using the portion of the group of the fields and the values identified from the different data structures; and
program code, stored on the computer-readable storage media, for sending the group of the reports to an output device, enabling performing an operation for the organization using the group of the reports.

18. The computer program product of claim 17 further comprising:
program code, stored on the computer-readable storage media, for displaying a selection area with a list of the group of the fields.

19. The computer program product of claim 17 further comprising:
program code, stored on the computer-readable storage media, for displaying a list of existing reports that includes at least one of the portion of the group of the fields.

20. The computer program product of claim 17, wherein the program code for displaying the group of graphical indicators comprises:
program code, stored on the computer-readable storage media, for displaying the group of graphical indicators in association with a group of labels for the group of the fields that are displayed with the group of the fields in the graphical user interface.

21. The computer program product of claim 17, wherein the selection is a first selection and the application includes a mapping that identifies which ones of the fields are selectable for use in the group of the reports and further comprising:
program code, stored on the computer-readable storage media, for displaying a group of functions for a field in the portion of the group of the fields that are selectable when the field is selected for the group of the reports;
program code, stored on the computer-readable storage media, for receiving a second selection of a function from the group of the functions in the user input, wherein the function generates information relating to the field;
program code, stored on the computer-readable storage media, for generating the information using the function; and
program code, stored on the computer-readable storage media, for including the information generated by the function in the group of the reports.

* * * * *